Patented May 6, 1924.

1,492,823

UNITED STATES PATENT OFFICE.

ANNA WOLL, OF WOODBRIDGE TOWNSHIP, MIDDLESEX COUNTY, NEW JERSEY.

OINTMENT.

No Drawing.   Application filed September 9, 1921.   Serial No. 499,537.

*To all whom it may concern:*

Be it known that I, ANNA WOLL, a citizen of the United States, residing at Woodbridge Township, county of Middlesex, and State of New Jersey, have invented a certain new and useful Ointment, of which the following is a specification.

This invention is an antiseptic ointment, adapted for general use in the customary manner, but it has been found to be particularly meritorious and efficacious in the treatment of burns, boils, carbuncles, eczema, gout, running sores and local inflammations generally.

The raw ingredients, in their entirety, entering into the composition, and the preferred proportions thereof, are as follows:

Two pounds of smoked fat bacon;
Two pounds of onions, preferably yellow;
One pound of leaf lard;
Six fluid ounces of linseed oil;
One pound of honey;
One-half pound of bees-wax, preferably white;
One pint of olive oil;
One fluid ounce glycerine;
Two fluid ounces of castor oil;
Four ounces of commercial shoemaker's pitch, i. e., wax, preferably two ounces of the white and two ounces of the black.

In compounding the foregoing ingredients to produce the final, preferred product, the bacon and onions, preferably cut in comparatively small pieces, are fried together at a general heat, until the onions acquire a dark brown color or shade, whereupon the mixture, while hot, is filtered or strained, thereby resulting in a bacon fatty extract of onions. While this fatty onion extract is in a heated condition, it being reheated if necessary to produce proper fluidity or liquefaction, the lard, bees-wax and shoemaker's pitch are gradually admixed therewith under steady agitation. When the foregoing ingredients are mixed to the point of homogeneity, and while the same is still in a heated condition, the linseed oil, olive oil and honey are gradually added thereto, under steady agitation, while the mixture is maintained slightly below the boiling point.

The resulting mixture is strained or filtered, while in heated condition, whereupon it is poured into a container, immersed in cold water and agitation continued until the mass begins to thicken, whereupon the castor oil and glycerine are added to it, and the agitation continued until the mixture is thoroughly cooled, when it will be found to have acquired the consistency of commonly employed salves or ointments.

It may be packaged in jars, bottles, tubes or other suitable containers as is customary with the marketing and dispensing of salves and ointments.

It will be understood that it may be applied to the parts under treatment in the customary manner and its use continued until the desired results are obtained. Continued and extensive use of the product in my own practice as a nurse, as well as by physicians and patients, has demonstrated the reliability and pronounced efficacy of the product for its intended purposes.

The foregoing process of compounding the ingredients constitutes a part of the present invention, and while I have described the preferred and best method of mixing the ingredients now known to me, as well as the preferred ingredients used together with their preferred proportions, yet I desire it to be understood that the process outlined, as well as the ingredients employed, may be modified in minor or formal details, such as by the substitution of equivalent operations or ingredients, and, moreover, that certain of the ingredients may be employed, without necessarily employing them all, as appears from the appended claim, which state the invention in terms commensurate with both the broad and specific aspects thereof.

Having thus fully described the invention, what I claim as new and desire to secure by Letters Patent is:

An ointment composed of fatty extract of onions with a stiffening composition comprising vegetable oils, honey, wax and pitch.

In testimony whereof I have signed the foregoing specification.

ANNA WOLL.